United States Patent [19]

Tymoszczuk

[11] 3,968,034
[45] *July 6, 1976

[54] PROCESS AND APPARATUS FOR TREATING WASTES BY A COMBINED ACTIVATED SLUDGE AND BIOLOGICAL FILTER BED

[76] Inventor: Jerzy Tymoszczuk, 3415 Girouard Ave., Apt. 914, Montreal, N.D.G., Quebec, Canada

[*] Notice: The portion of the term of this patent subsequent to Dec. 10, 1991, has been disclaimed.

[22] Filed: Oct. 15, 1974

[21] Appl. No.: 515,044

Related U.S. Application Data

[63] Continuation-in-part of Ser. No. 100,220, Dec. 2, 1970, Pat. No. 3,853,752.

[52] U.S. Cl. .................................. 210/8; 210/17; 210/151; 210/261; 210/275
[51] Int. Cl.² ........................................... C02C 1/04
[58] Field of Search .................. 210/3, 4, 5, 6, 7, 8, 210/15, 17, 150, 151, 268, 189, 275, 261, 14

[56] References Cited

UNITED STATES PATENTS

| | | | |
|---|---|---|---|
| 2,348,854 | 5/1944 | Schreiber | 210/3 |
| 2,364,298 | 12/1944 | Kamp | 210/150 |
| 2,388,795 | 11/1945 | Montgomery et al. | 210/17 |
| 3,220,706 | 11/1965 | Valdespino | 210/14 |
| 3,377,272 | 4/1968 | Cann | 210/18 |
| 3,563,285 | 2/1971 | Bykov | 210/268 |
| 3,563,888 | 2/1971 | Klock | 210/150 |
| 3,649,532 | 3/1972 | McLean | 210/151 |
| 3,853,752 | 12/1974 | Tymoszczuk | 210/150 |

FOREIGN PATENTS OR APPLICATIONS

| | | | |
|---|---|---|---|
| 971,338 | 9/1964 | United Kingdom | 210/17 |
| 542,008 | 12/1941 | United Kingdom | 210/151 |

Primary Examiner—Charles N. Hart
Assistant Examiner—Benoit Castel
Attorney, Agent, or Firm—Larson, Taylor and Hinds

[57] ABSTRACT

This invention relates to aerobic biological processes for treating waste waters or sewage and an apparatus for carrying out the process.

34 Claims, 24 Drawing Figures

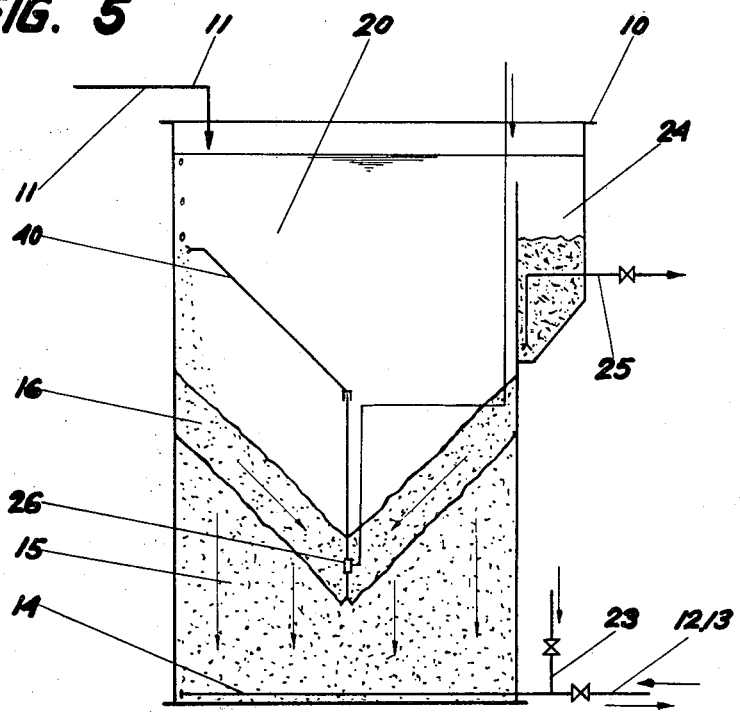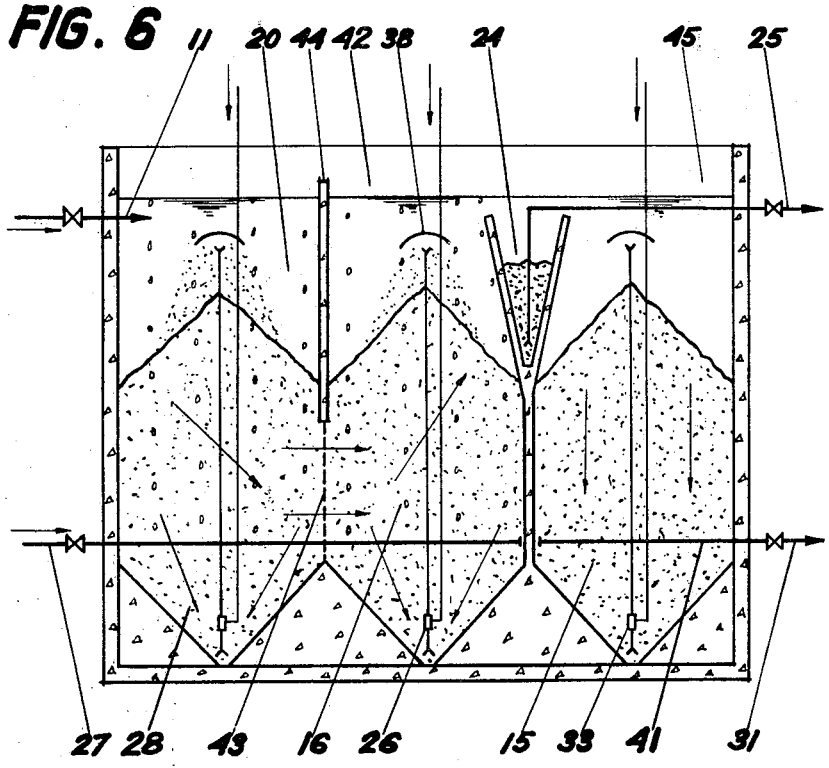

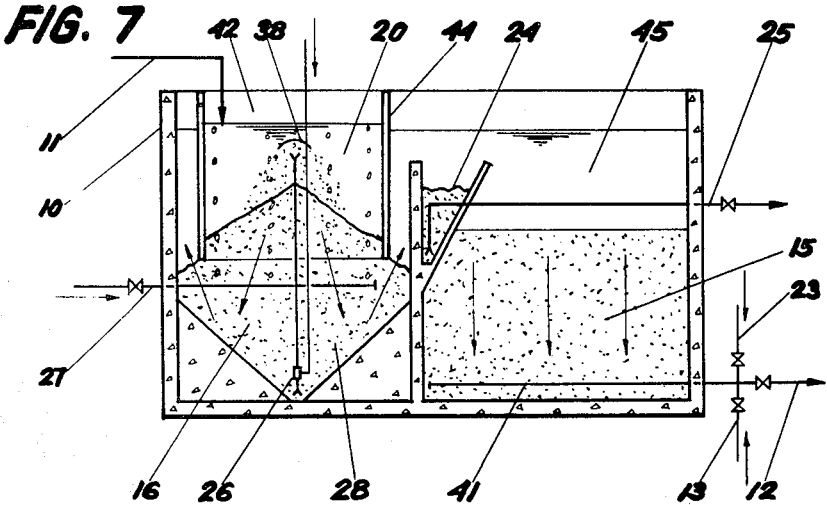
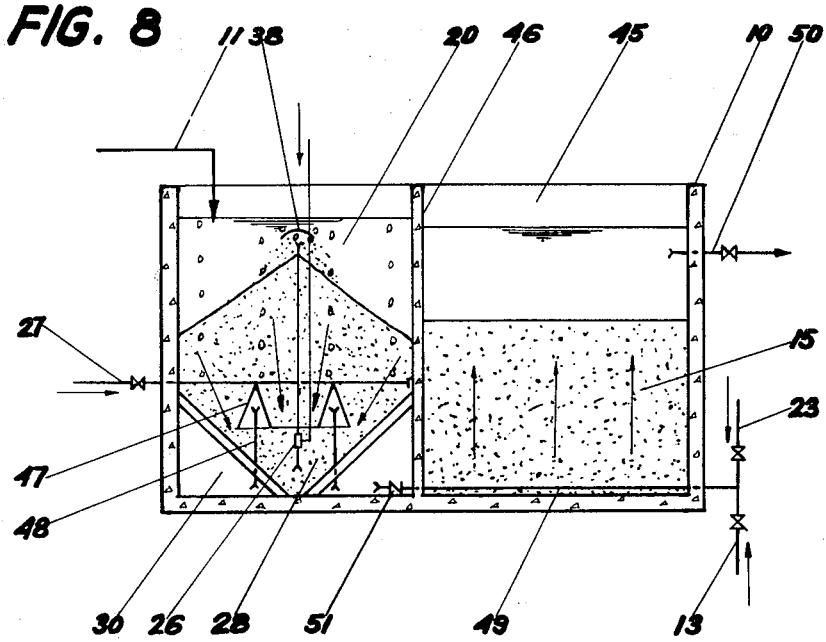

PROCESS AND APPARATUS FOR TREATING WASTES BY A COMBINED ACTIVATED SLUDGE AND BIOLOGICAL FILTER BED

RELATED APPLICATION

This application is a continuation-in-part of my application Ser. No. 100,220, filed Dec. 2, 1970, now U.S. Pat. No. 3,853,752.

PRIOR ART

Until recently the aerobic biological process of purifying wastes and sewage has generally been carried out by four basic methods; (a) activated sludge, (b) trickling filters, (c) aerated lagoon, (d) irrigation. Various modifications of these processes are also known. Submerged trickling filters (so-called "contact filters" — with or without aeration) have also been used in the past. However, these have been largely abandoned due to difficulties in operation and low treatment efficiencies. The three processes most commonly employed at present are activated sludge, trickling filters and aerated lagoon processes. These systems are economical and effective. Nevertheless if complete biological purification is required they are complicated and expensive. In the case of activated sludge, large quantities of air, and large tanks to provide long contact times, primary and secondary clarifiers and expensive sludge handling facilities are all required. Further the activated sludge process is susceptible to periodic upsets in operation.

Trickling filters require large structures, give oprational problems at cold temperatures and have odour problems. They also require primary and secondary clarifiers and sludge handling facilities.

Aerated lagoons require large areas to provide the necessary 5 to 10 days retention time; large aeration systems' give operational problems at cold temperatures and require primary and secondary clarifiers or settling basins with sludge handling facilities.

To remedy some of the above deficiencies the above processes are being supplemented by tertiary treatment steps to achieve a more complete degree of purification. This adds further expense.

SUMMARY OF THE INVENTION

The present invention avoids the above deficiencies and provides a high degree of biological waste purification in a short retention time and with a small requirement of aeration. The invention also reduces the amount of structure required, thus providing substantial economic benefits. The invention makes possible the elimination of primary and secondary clarifiers and sludge handling facilities. In addition, when the apparatus described in this invention is used in a multiple step arrangement it purifies the wastes sufficiently to allow them to be recycled and, after disinfection, added directly to water supply systems. In the present invention in its basic form the treatment process of the waste takes place in one tank which contains a number of interconnected zones. The waste is introduced into the first zone which is an Activated Sludge (AS) zone and flows upwardly or downwardly through the lower part which is a submerged aerated Biological Moving Filter Bed (BMFB) zone and finally descends into the third zone which is a submerged polishing non-aerated Biological Stable Filter Bed (BSFB) zone with downwards or upwards flow.

The air is introduced into the second zone i.e. the submerged Biological Moving Filter Bed (BMFB) as compressed air or by drawing air by means of a vacuum.

The air traverses the media and, once above the bed, aerates the AS zone. In this basic form the invention provides all aerobic biological treatment functions in one chamber using a single stage of aeration. The first zone is comparable to the actived sludge process. The second zone is the biological reactor and possesses a high ability to degrade organic matters. The third zone is the final polishing non-aerated biological stable filter bed. The BSFB zone filters the treated effluent from the first AS and second BMFB zones and eliminates the need for a secondary clarifier. In addition the bacteria developed on the filter media further purifies the wastes producing a more complete biological treatment. The AS and BMFB zones eliminate the need for primary clarifiers and sludge handling facilities.

The aeration of the BMFB zone creates four conditions. First, the oxygenation of the treated wastes to provide adequate amounts of oxygen required for bacteria. Secondly, the scouring of excess bacteria into the AS zone and the simultaneous aeration of that zone. Thirdly, the maintenance of a constant porosity of the filter media with the result that the flow of wastes through the media is maintained without an excessive head loss. Fourthly, the provision of an endogenous respiration process due to a very high rate of degradation of organic matter. This fourth feature eliminates an excess of biological sludge and costly sludge handling facilities. The wastes treated by this process are fully biologically treated and are discharged to the receiving body directly or after disinfection. When this process is repeated in series the purification degree is extremely high. The AS zone operates under accepted present day parameters for this process within a wide range of BOD loadings and mixed liquor suspended solids (MLSS) concentrations. In the context of the present invention, to reduce tank volumes and cost, the BOD loadings and MLSS concentrations are very high and the retention time is very short. This results in a lower BOD removal efficiency, which, however, is fully compensated for by the BOD removal in the second and third zones, that is, the BMFB and BSFB zones.

If it is necessary to supply additional air to the process, a supplementary aeration system can be provided using diffused air, mechanical aerators or using a diffuser grid placed in the BMFB zone. The introduction of wastes to the open or closed tanks are carried out under gravity, under pressure or vacuum conditions, by conventional, accepted techniques.

The eventual extraction of excess sludge from the AS zone takes place in an especially designed sludge concentrator thus reducing the volume of sludge withdrawn. This concentrator may, in certain cases, be placed external to the unit or even completely separated from the unit. The concentrator may be constructed to include gravity or pumped sludge recirculation or recirculation by means of an air-lift device. This sludge is then recycled to the head of the plant or returned, where the process parameters require it, to the AS zone. The BMFB and BSFB are designed and executed similarly to present day rapid sand potable water filters either with downwards or upwards flows or with air-lifts for moving bed filters. Each lift may be a simple air-lift operated by compressed air. Each airlift may also be associated with a separate water supply directed to the bottom of the air-lift. The difference between the potable water filters and the present invention is that the BMFB and the BSFB treat the sewage and contain a biological mass but the BMFB is aerated during operation. The quantity of air required and the media size are a function of the nature of the wastes to be treated or of effieiency of the treatment desired.

Furthermore, whenever required the BSFB is backwashed. The backwashing may be carried out in one of four ways; a. using a combination of air and water according to known present days techniques; b. using only water; c. using both methods but before the backwash is started the filter is drained to the level of the media and refilled by backwashing to the normal liquid level, without wasting the backwash effluent from the unit; and d. using an air-lift placed in the bottom of the conic hopper.

In the first two cases, the biological sludge removed from the BSFB and the BMFB zones as a backwash effluent is recycled to the head of the plant. In the third and fourth cases all the backwash flow remains within the filter unit without any loss of biological solids.

Backwash waters may consist of purified wastes or some outside supply of water. The time of backwash will not exceed 10 to 20 minutes, depending on which backwash system has been chosen.

The length of operation between backwashings will be a function of sewage strength, of media sizing, media depth, and the desired degree of purification of any given wastes and will be governed by the quality of the effluent required and available head loss. The essential function of the BMFB is to provide a high level of BOD reduction and high degree of endogeneous respiration in a very short time by utilizing the extremely large active surface area provided by small bacteria flocs flowing through the aerated moving media. This media provides for both bio-coagulation and bio-degradation of organic materials which remain in the form of dissolved compounds and suspended solids after passing through the AS zone.

To achieve the above, during operation the BMFB and AS zones are aerated by means of compressed air or air drawn through both zones by vacuum or air-lifts in the amounts essential for the transformation of organic compounds into inorganic salts. Air supply can be provided either continuously or intermittently. The quantity of air required for full purification will, by principle, be very small and the aeration time will be very short.

The flow of waste through the BMFB can be upwards, providing conditions similar to the backwash stage, or downwards through the recycled filter media by means of air-lifts. The basic function of the BSFB is a final polishing of treated wastes by separation of all colloidal and suspended solids from treated effluent. It simultaneously provides further bio-degradation of remaining organic compounds. The flow of wastes through the BSFB can be either downwards or upwards or horizontal similar to the present day rapid potable water filters. The required oxygen for the BSFB bacteria is supplied by flowing treated effluent containing dissolved oxygen through the media.

Both the BMFB and BSFB zones contain finely divided particulate, filtering media which may employ fine and coarse sand, plastic, anthracite, activated carbon or any other suitable material of varying sizes and densities and in various combinations. The construction of the distribution and/or collection system for both wastes and air is similar to known techniques currently employed. This includes filters equipped with false bottoms and strainers as well as filters equipped with underdrain piping systems, or tile blocks or porcelain balls, etc. The size of the filters, as well as the quantity of construction details are a function of the wastes strength and the degree of purification required. The time of contact between the wastes and the filter beds for full biological purification will, by principle, be very short and the quantity of air required will be very small.

A variant of the present invention can be constructed with upwards flow through the BMFB by using a pump for continuous recycling of waste between the AS zone and with downwards flow through the BSFB zone and traditional backwash systems.

A further variant of the present invention consists of the BMFB with downwards flow and an air-lift as an aerating and pumping device for recycling waste between the AS zone. The BSFB zone has the same downwards flow but backwash for the whole filter media is performed by using a second air-lift placed in the bottom of a conic hopper. The required supplementary air is supplied through a grid placed within the BMFB zone. The collecting system of treated wastes is placed on the sloping area of the conic hopper. Another variant with downwards flow through the media is constructed with two tanks placed one in the other. The larger tank contains the AS zone, the smaller tank contains two conic hoppers, each with a separate airlift device. The outer hopper holds the BMFB media, which are aerated and recirculated by means of a longer air-lift. The inner hopper holds the BSFB media, which are backwashed by means of a shorter air-lift; the As zone is aerated separately. If required additional air is introduced to the BMFB zone. A baffle may be placed on top of the outer hopper to initiate a scouring flow at the moving media surface.

To improve the BMFB media recirculation with downwards flow and air lift aeration, a conic baffle may be installed at each air-lift to direct recycled media on the baffle circumference.

A variant of the above solution is to replace the conic baffle by a rotating arm as an upper part of the air-lift pipe.

A further variant of the invention with an air-lift arrangement is one tank with a number of interconnected comparments where the BMFB and BSFB zones are separated by solid and permeable baffles which change the direction of waste flow from downwards to horizontal and upwards and again downwards. Air-lifts placed in the BFMB provide aeration and recirculation of the media, but air-lifts located in the BSFB only periodically backwash the media. A supplementary air grid can be installed within the BMFB zone if required. A sludge concentrator is installed between the BMFB and BSFB zones if required. The collecting system of treated effluent is placed in the lower part of the BSFB zone.

In another variant of the above the AS and the BMFB zones are contained in a first compartment and a second compartment contains the BSFB zone with downwards flow. Separation of the AS and BMFB zones from the BSFB zone is achieved by a cylindrical baffle placed in the upper part of the BMFB media, which are aerated and recirculated by means of an air-lift. If required supplementary air is supplied to the BMFB zone. A sludge concentrator is located between the first and second compartments.

A further variant of the invention has the AS and the BMFB zones in one compartment where aeration and recirculation of the media is provided by air-lift. Flow is downwardly through the moving media through a specially designed collecting system having the shape of an inverted "V" ring baffle supported on a few pipes. These pipes communicate with the space below the bottom of a conic hopper. Flow enters the BSFB zone in the second compartment upwardly through the underdrain system which also is used for backwashing.

The BSFB zone is separated from the AS and BMFB zones by a solid vertical baffle. The upper part of the BSFB zone contains a layer of treated effluent being discharged to the receiver, or backwash waste which is returned to the AS zone or to the plant header.

Another variant to the above contains the AS and BMFB zones within one compartment where the aeration and recirculation of the media is performed by an air-lift.

The downwards flow through the moving media passes through a permeable, lower part of a vertical baffle and enters the BSFB zone with upwards flow. The BSFB zone is backwashed by an air-lift and the backwash overflow is returned to the AS zone or to the head of the plant as an overflow to the discharge launder. The AS zone has its own separate aeration system.

Another variant of the basic unit consists of two compartments. The first compartment contains the AS and aerated BMFB zones; upwards flow is by means of a recycle pump and compressed air. The second compartment contains the BSFB zone which features downwards flow and is backwashed in the traditional manner. Backwash overflow is discharged to the AS zone.

In a variation of the above a sludge concentrator is placed between the two compartments. The concentrator reduces the amount of sludge carried from the first to the second compartment and collects the backwash water being discharged to the plant header or to the AS zone.

Another variant of the above differs only by working under vacuum.

A variant of this vacuum unit consists of the AS and BMFB with upwards flow in the first compartment and the second stage of the BMFB and BSFB with downwards flow having an air-lift arrangement in the second compartment. Vacuum is maintained by constant recirculation of the waste through the first stage of the BMFB and AS zones using a recycle pump and venturi nozzle or orifice built into the return line which discharges excess of air from the unit. However, to create the initial vacuum a vacuum pump installation is required. The entire amount of air required for the process is supplied under atmospheric pressure through control valves. Backwash of the BSFB media is performed by an air-lift arrangement. Backwash is returned to the AS zone or to the head of the plant. The collecting system for treated effluent consists of inverted "V"-shape, longitudinal baffles supported by horizontal pipes in communication with an underdrain space below the conic hoppers. A further variant of the basic unit recycles waste between the As zone through the BMFB with upwards flow by means of air introduced into the bottom of the BMFB zone which is located along one wall of the AS compartment and from where waste passes to the BSFB or other treatment placed in the second compartment. Waste is also directed below the BMFB zone.

A variant of the above consists of many vertical columns filled with the BMFB media placed within the AS compartment. Upwards flow and recirculation through the BMFB media is achieved by means of air introduced into the bottom part of each column. A second compartment contains the BSFB zone or other treatment system.

Another variant of the above also contains vertical columns filled with BMFB media but aeration and recycle of waste between the BMFB media and the AS compartment is performed by an air-lift arrangement. The AS zone may have a separate aeration system if required. Further treatment takes place in the second compartment.

A different solution for aeration and recycle of waste between the AS zone and the BMFB media with upwards flow is achieved by surface aerators placed on the top of each vertical BFMB column. When supplementary aeration is required additional air is introduced to the bottom part of each column or directly to the AS compartment.

A similar variant to the above contains a pump type aerator instead of surface aerators.

Another variant of the above, consists of the BMFB zone with upwards flow placed along one wall of the AS compartment. Above the BMFB zone is located a rotating brush which creates aeration and recirculation of waste through the BMFB media between the AS zone. Feed of raw waste is directed below the BMFB zone. If required additional air is introduced to the bottom part of the BMFB zone or to the AS zone. From the AS zone waste passes into the second compartment for further treatment.

Another variant consists of a vertical column closed at the bottom and open at the top, filled with upwards flow BMFB media. Recirculation is achieved by a pump placed in the AS compartment with air supply into the bottom part of the BMFB zone. If required additional air may be introduced to the AS zone.

A further variant of the basic unit has concentric horizontal flow through the BMFB and BSFB media and is constructed within two tanks placed one in the other. The bigger tank contains the AS zone. The smaller tank consists of three vertical cylinders centrally located. The cylinders are conical at their ends and all of them have permeable cylindrical walls. The largest cylinder contains the BMFB media which are continuously aerated and circulated by means of air-lift. The second cylinder contains the BSFB media which are backwashed if required by means of a second air-lift. The smallest, third, cylinder collects the treated effluent. If required additional air is supplied to the BMFB zone and to the AS zone.

A similar variant of the above consists of the same two main tanks, but the smaller tank has a different construction. Its largest cylinder has a double wall; the outer solid and the inner permeable. This creates a collecting system for the treated effluent and also means to hold the BSFB media which are backwashed by means of an air-lift. The second cylinder has permeable vertical walls and contains the BMFB media, which are aerated and circulated by means of a second air-lift.

The third permeable wall cylinder distributes waste from the AS zone to the BMFB zone. The BMFB and AS zones can be additionally aerated if required. Another similar variant of the above consists only of one cylindrical tank which contains an AS zone in its upper part with a sludge concentrator, if required. The lower part of the tank contains three permeable cylinders. The largest one creates the waste distribution system from the AS zone to the BMFB media which are aerated and recirculated by means of an air-lift. The second cylinder separates the BMFB from the BSFB media, which are backwashed by means of an air-lift. The third and smallest cylinder separates the BSFB from treated effluent, which is discharged from the unit. If required, additional air is supplied to the BMFB zone.

A similar variant to the above consists of one tank with an AS zone and sludge concentrator in its upper part. The lower part contains three permeable cylinders. The smallest one creates the waste distribution system from the AS zone to the BMFB media, which are aerated and recirculated by means of air-lift. The second cylinder separates the BMFB from the BSFB media, which are backwashed by means of air-lift. The third and largest cylinder separates the BSFB from treated effluent, which is discharged from the unit. If required additional air is supplied to the BMFB zone.

In all the above variants the waste fed to the process should be pretreated by grit removal and screening.

When the process is designed to work without an excess of biological sludge the sludge concentrator can be omitted.

Furthermore all the above variants may have various shapes and configurations. The units may be in series. They may be installed in existing facilities, such as primary and secondary clarifiers, activated sludge units, aerated lagoons and other existing works to increase their capacity and/or improve their efficiency.

BRIEF DESCRIPTION OF DRAWINGS

Embodiments of the invention are illustrated in the attached drawings, each of which shows a process and an apparatus for treating wastes according to the invention.

DETAILED DESCRIPTION

Throughout the drawings the same number is used for the same part.

Figure 1:
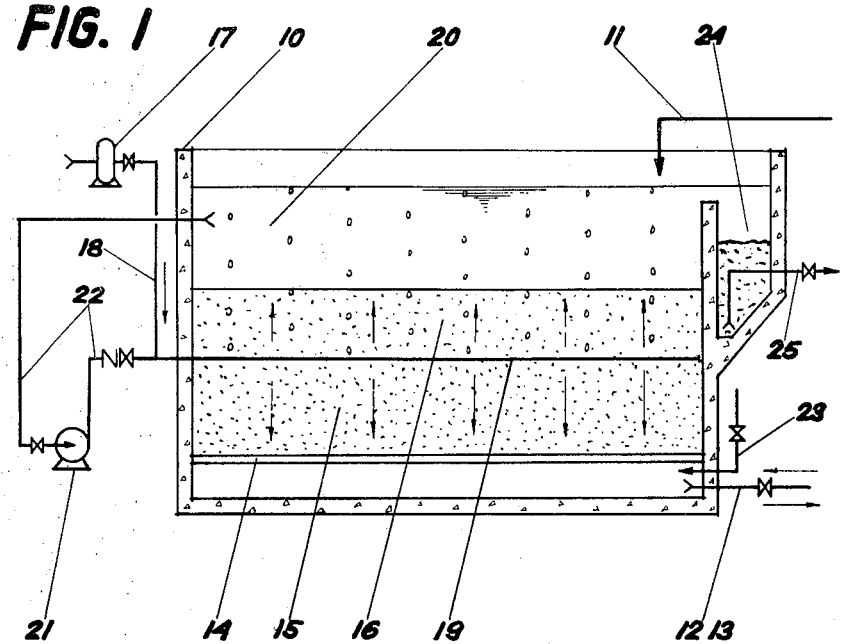

Referring to FIG. 1, this embodiment consists of an open or closed tank 10 of any shape which may be constructed of any suitable material, equipped with an inlet connection 11 and a treated effluent discharge 12 which also acts as a backwash inlet 13. In the tank there is a false filter floor 14 which supports the BSFB media 15 and the BMFB media 16.

The air required for waste and BMFB media aeration is supplied by a blower 17 through the pipe 18 which is connected with recycle waste distribution grid 19. Waste is recycled between an AS zone 20 by pump 21 equipped with necessary piping and valves 22. For backwash, air supply 23 is introduced below the false floor 14. The excess of sludge from the AS zone is gathered in a sludge concentrator 24 from which it is extracted through a pipe 25. The sludge concentrator also may be used to collect and discharge the backwash overflow when the filter is being washed.

Figure 2:
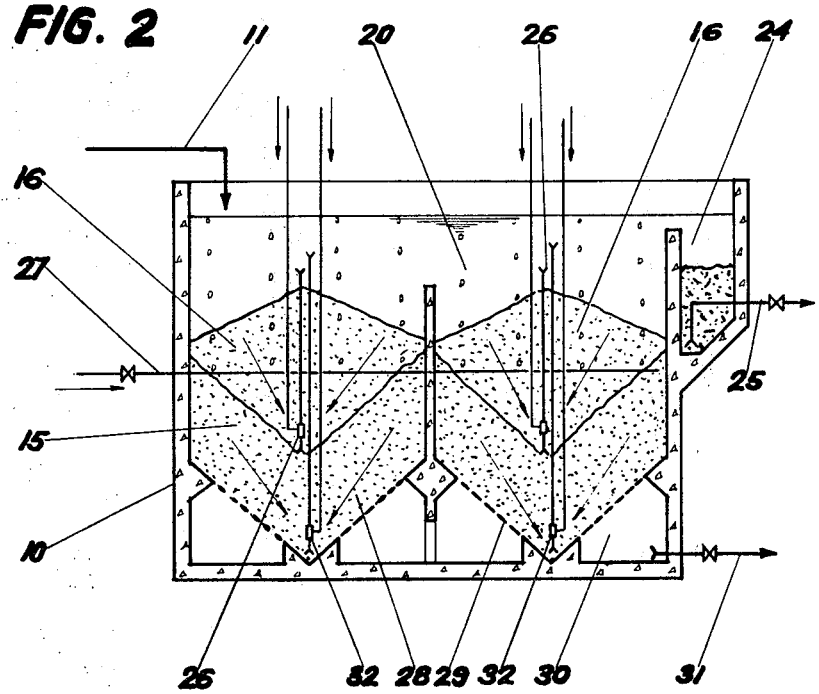

The embodiment of FIG. 2 differs from that of FIG. 1 by not having a recirculation pump 21 but an air-lift 26 for waste aeration and recycling at the BMFB media 16. In addition it has supplementary air distribution grid 27 to aerate the BMFB 16 and AS zone 20. The BSFB 15 is positioned in conic hoppers 28, whose bottom sloping walls are equipped with a collecting system 29 for treated effluent. the effluent passes to a void space 30 below the conic hoppers 28 from where it is discharged through the pipe 31. Backwash is applied to the BSFB and BMFB, if required, by a second set of air-lifts 32 located at the bottom of conic hoppers 28. If necessary excess sludge from AS zone 20 is collected and withdrawn through the sludge concentrator 24 and discharge pipe 25.

Figure 3:
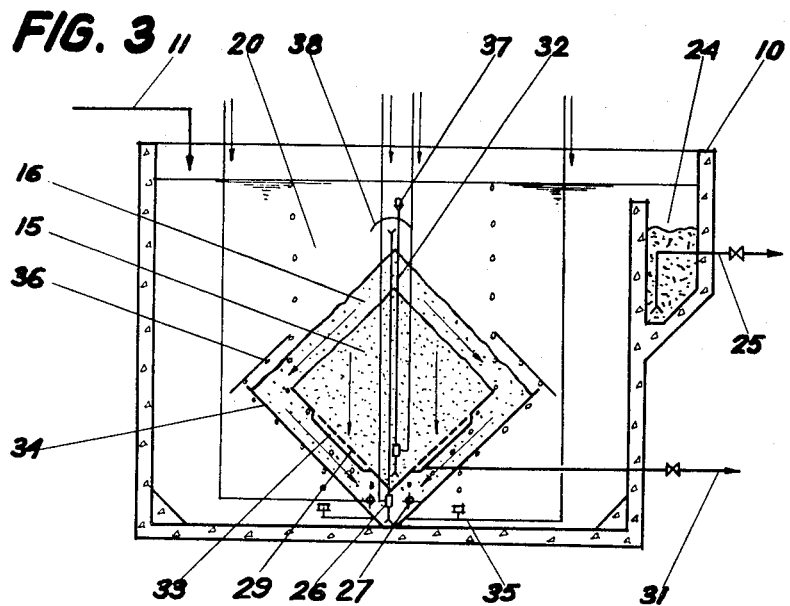

The embodiment of FIG. 3 differs from that of FIG. 2 by having the BSFB zone 15 separated from BMFB zone 16 a smaller conic hopper 33 equipped with a collecting system 29 for treated effluent, which is discharged by pipe 31. The BMFB media is located within a larger conic hopper 34 which is placed into the AS zone 20. Additional air for the aeration of the AS zone 20 is provided through a diffusion system 35. Additional air supply 18 for the BMFB zone 16 is also provided if required. A baffle 36 initiates a scouring flow at the BMFB surface.

The outlet of the BSFB air-lift 32 is closed by check valve 37 for protection against sand entering. For better oxygen transfer from air-lift 26 to the waste deflector 38 is placed above the air-lift 26 discharge. The deflector simultaneously also separates moving media 16 from recirculating wastes.

Figure 4:
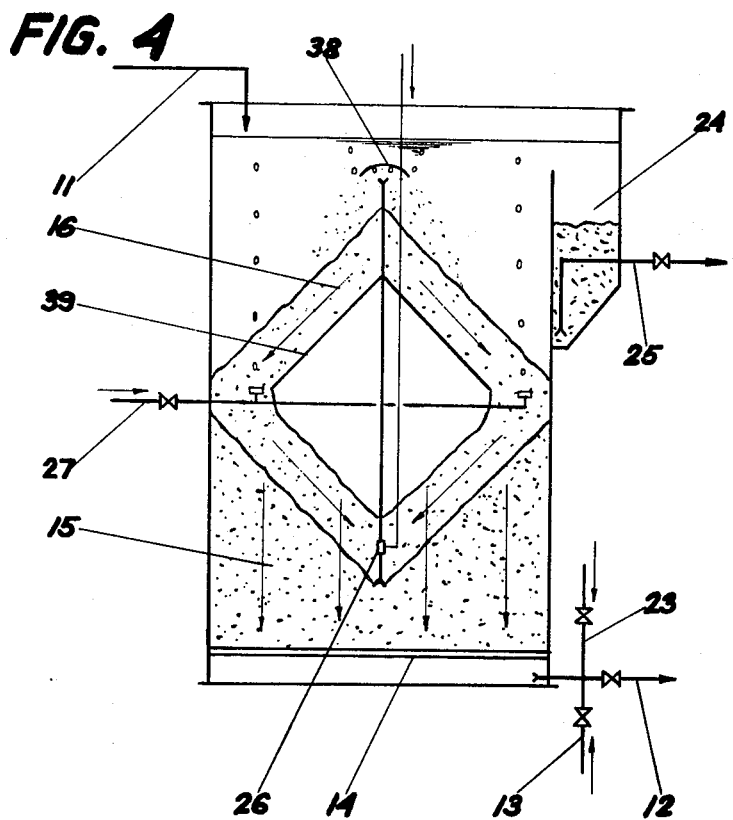

FIG. 4 shows a different arrangement for the BMFB media recirculation. A conic baffle 39 directs moving media 16 from the air-lift 26 to the periphery of the treatment unit.

FIG. 5 shows an arrangement for the BMFB media recirculation in which an upper part of the air-lift pipe 26 ends with a bent, rotating arm 40. False bottom 14 is replaced by underdrain piping system 41.

FIG. 6 shows an alternative arrangement as two AS and BMFB compartments 42 separated by a permeable baffle 43 and solid baffle 44 within the AS zone 20. In the first compartment, sewage flows downwards. It flows upwards in the second compartment followed again by downflow in BSFB compartment 45 where the treated effluent is gathered by collecting grid 41 placed in the lower part of the media 15. A sludge concentrator 24 is located ahead of the BSFB compartment 45. Air-lifts 26 are placed in the first and second compartments for circulation of the BMFB media together with sewage, and in the third compartment there is an air-lift 32 for backwash of BSFB media 15. If necessary a supplementary air distribution grid 27 is placed in BMFB media 16.

FIG. 7 shows an arrangement similar to FIG. 6 but having only two compartments, separated by solid baffle 44 within the AS zone 20. First compartment 42 contains As 20 and BMFB 16 zones with downwards and upwards flows followed by the second compartment 45 of the BSFB zone 15 having a downwards flow of treated waste. The treated waste is collected by collector grid 41.

FIG. 8 shows an arrangement similar to FIG. 7 but having the first compartment 42 entirely separated from the second compartment 45 by a solid baffle 46. Waste flows downwards through the first compartment and passes collecting system 47 which consists of an inverted "V" shape ring baffle supported on pipes 48 which are in communication with a void space 30 below the conic hopper 28. Waste then flows through a distribution system 49 placed in the second compartment, upwards through the BSFB media 15 and terminates in the upper part of the second compartment 45 from where it is discharged through the pipe 50. The distribution system 49 is also used for backwashing. For this purpose, to protect the first compartment from backwash water, an entrance check valve 51 is installed. After backwash water is collected in the second compartment 45 above the BSFB media 15 it is discharged through the treated effluent outfall pipe 50 to the head of the plant or returned to the AS zone 20 if required.

Figure 9:
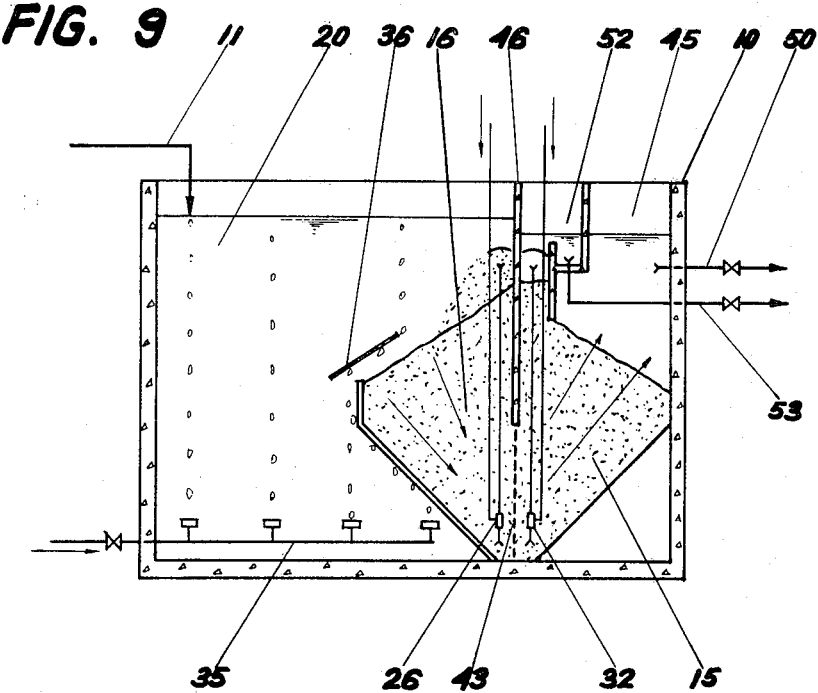

The embodiment of FIG. 9 differs from that of FIG. 6 by having only two compartments. In the second compartment 45 a BSFB zone 15 has upwards flow and the AS zone 20 is separated from the upper part of the second compartment 45 by a solid baffle 46. A backwash of the BSFB media 15 is performed by air-lift 32 which discharges the backwash water to the launder 52 from where it is directed to the head of the plant or returned to the AS zone 20, through the pipe 53. The AS zone 20 may have its own separate aeration system 35 if required.

Figure 10:
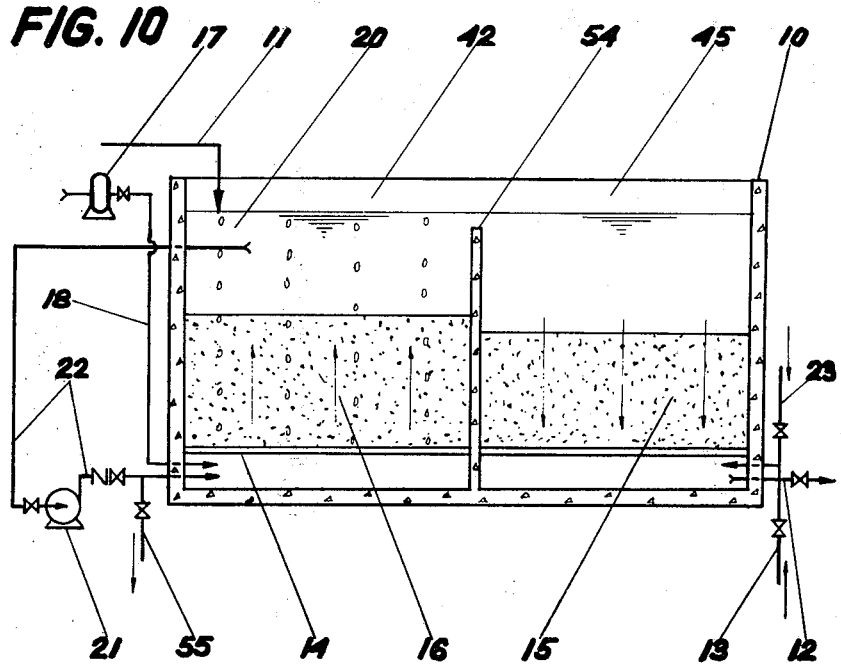

FIG. 10 shows an arrangement similar to FIG. 1 but having separate compartments for the BMFB zone 16 and the BSFB zone 15. Both compartments are in communication through the weir wall 54. The backwash overflow from the second compartment 45 is discharged back to the first compartment 42 and is wasted through drain 55 if required.

Figure 11:
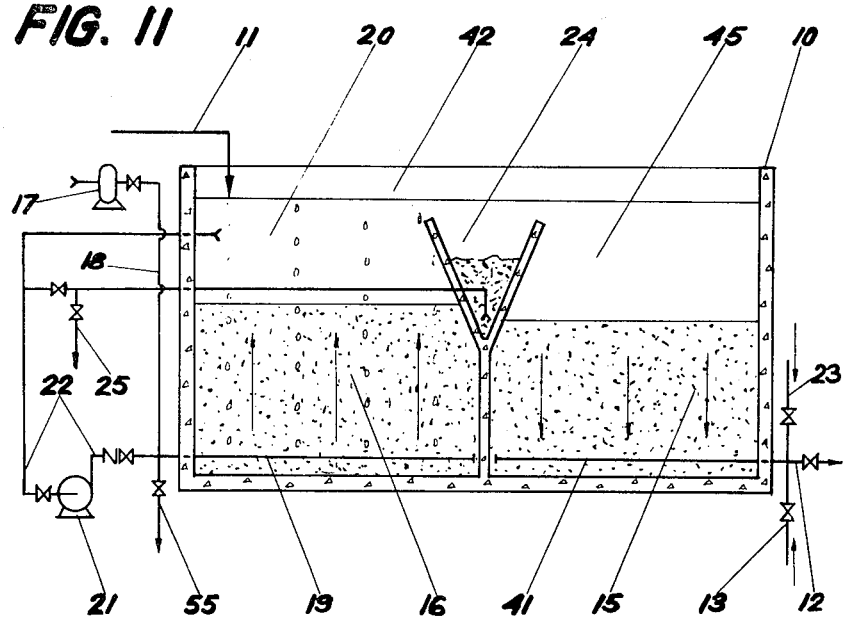

FIG. 11 is as FIG. 10 but between the two compartments there is a sludge concentrator 24 from which sludge is recycled within the first compartment through the pump 21 or returned to the head of the plant by pipe 25.

Figure 12:
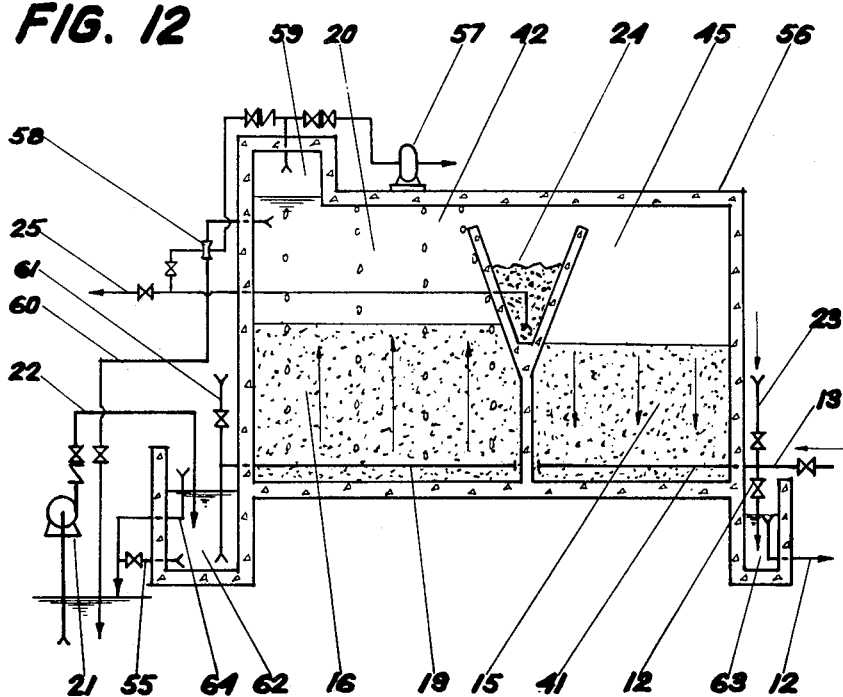

FIG. 12 is as FIG. 11 but works under vacuum. The apparatus has a closed tank 56, vacuum pump 57 to locate the initial vacuum of the unit until venturi nozzle or orifice plate 58 can create a vacuum in the bell 59. Recirculation of the sewage is performed by the pump 21 and return line 60.

Air is drawn through the BMFB zone 16 as an AS zone 20 under atmospheric pressure by the pipe 61. Sewage flows through the unit from inlet well 62 to outlet well 63. Inlet well 62 is equipped with emergency overflow 64 and drain 55. The sludge concentrator is connected to the venturi nozzle 58 for constant sludge circulation. Alternatively the sludge can be taken away from the unit through the pipe 25.

Figure 13:
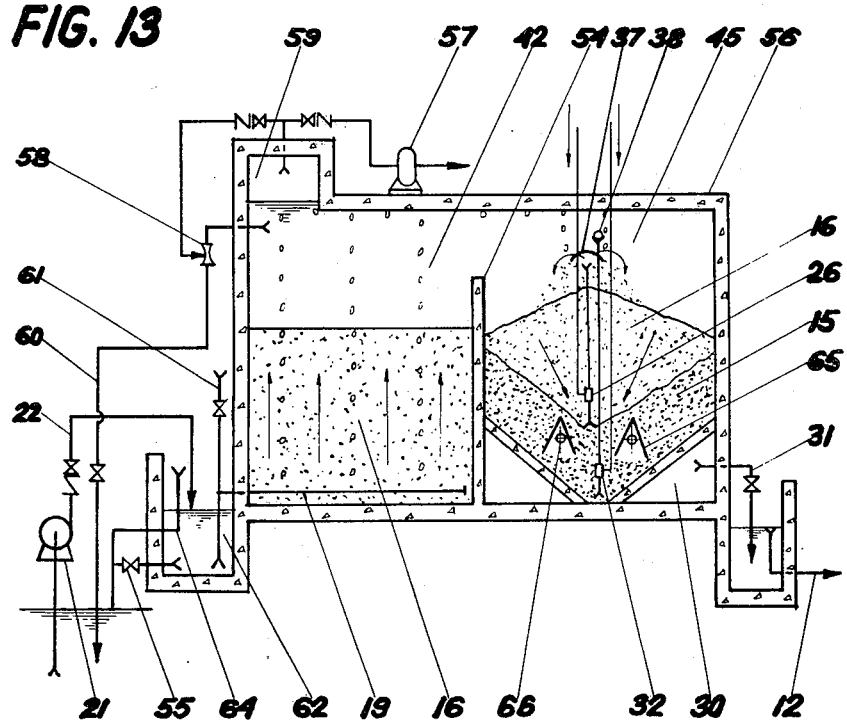

FIG. 13 is similar to FIG. 12 but without sludge concentrator 24 and with a second compartment 45 containing a second stage of BMFB zone 16 and the BSFB sone 15. Both zones are equipped with air-lifts; air-lift 26 for BMFB media recycle and air-lift 32 for the BSFB media backwash. The collecting system of treated effluent consists of inverted "V"-shaped longitudinal baffles 65 supported by perforated horizontal pipes 66 in communication with underdrain space 30 below the conic hoppers.

Figure 14:
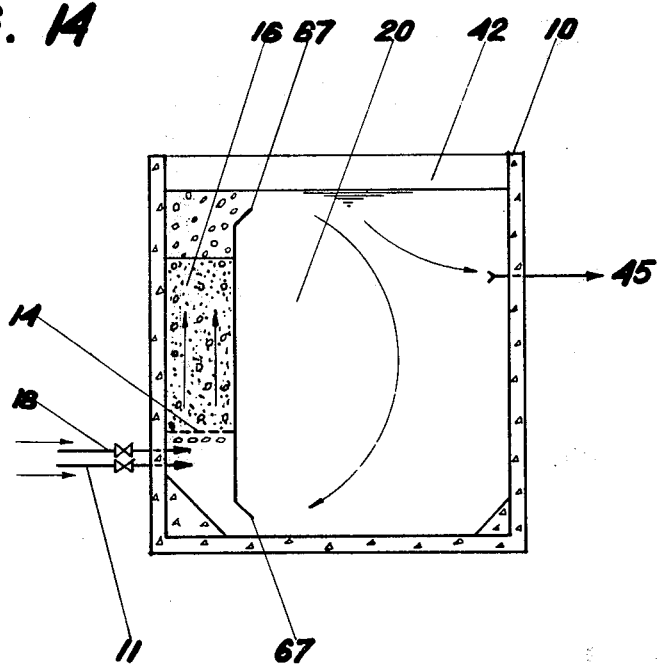

FIG. 14 shows an arrangement similar to FIG. 10, but having waste recycle between the AS zone 20 through the BMFB zone 16 with upwards flow by air introduced through the pipe 18 into the bottom part of BMFB zone 16. Zone 16 is located along one longitudinal wall of the AS zone compartment 20, and has lower and upper longitudinal baffles 67. Waste 11 to be treated is directed below the BMFB zone 16. Further treatment for solids removal takes place in the second compartment 45 which can be located separately and may consist of the BSFB media 15 or other traditional process.

Figure 15:
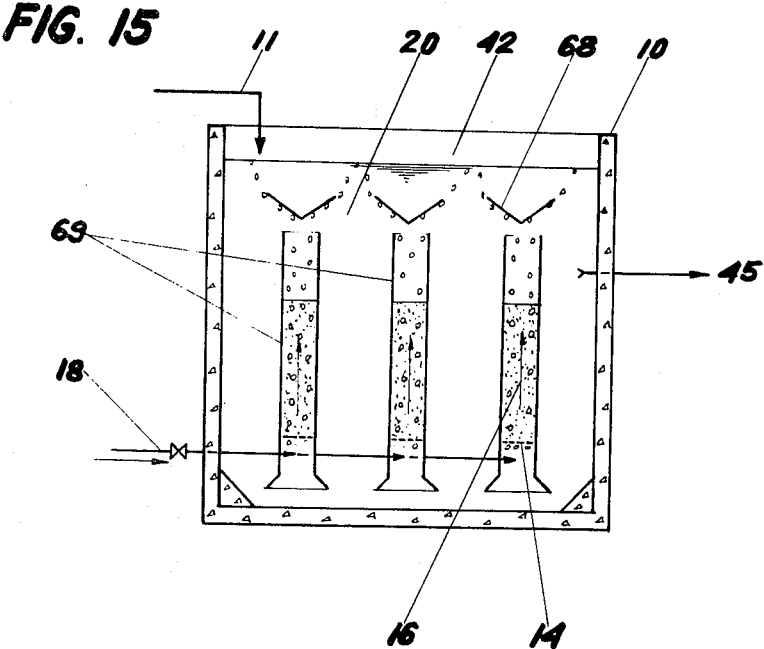

FIG. 15 is similar to FIG. 14 but has many vertical columns 69 filled with the BMFB media 16. Baffles 68 on the top of columns 69 create a vortex. Waste input 11 is directed to the AS zone 20.

Figure 16:
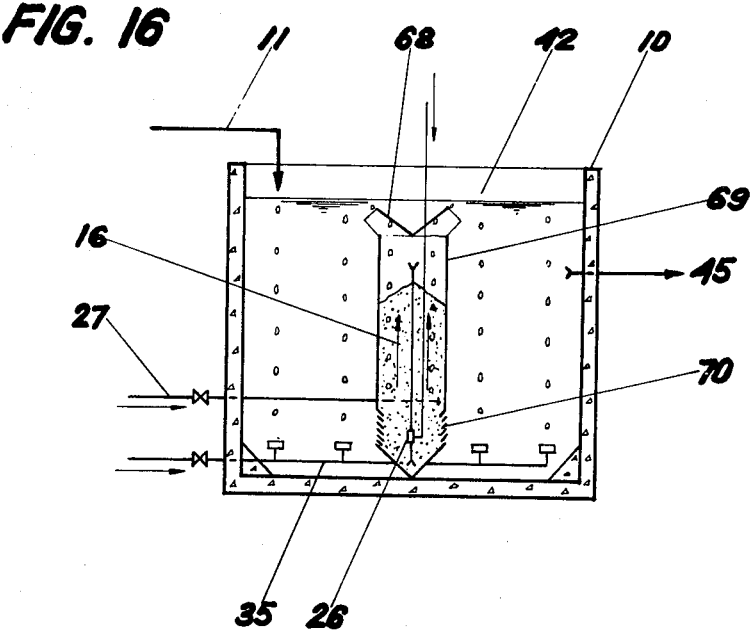

FIG. 16 shows an arrangement similar to FIG. 15 but having the lower part of column 69 as a permeable wall 70 to allow recirculation of the AS zone 20 by an air-lift 26 placed within the BMFB zone 16. The AS zone 20 may have a separate aeration system 35 is required.

Figure 17:
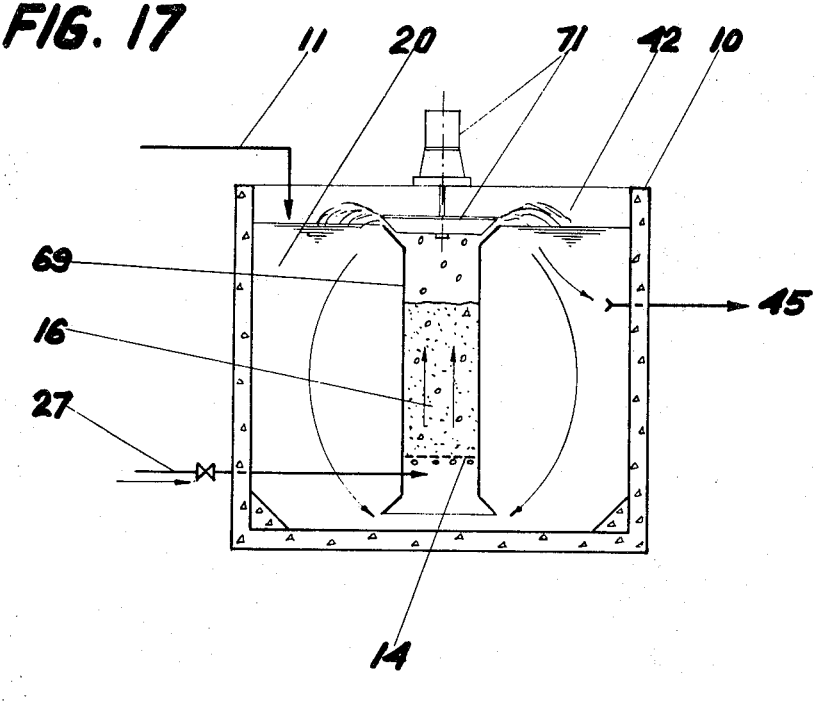

FIG. 17 shows an arrangement similar to FIG. 15 but surface aerators 71 are positioned on top of the column 69. Additional air is supplied through pipe 18 if required.

Figure 18:
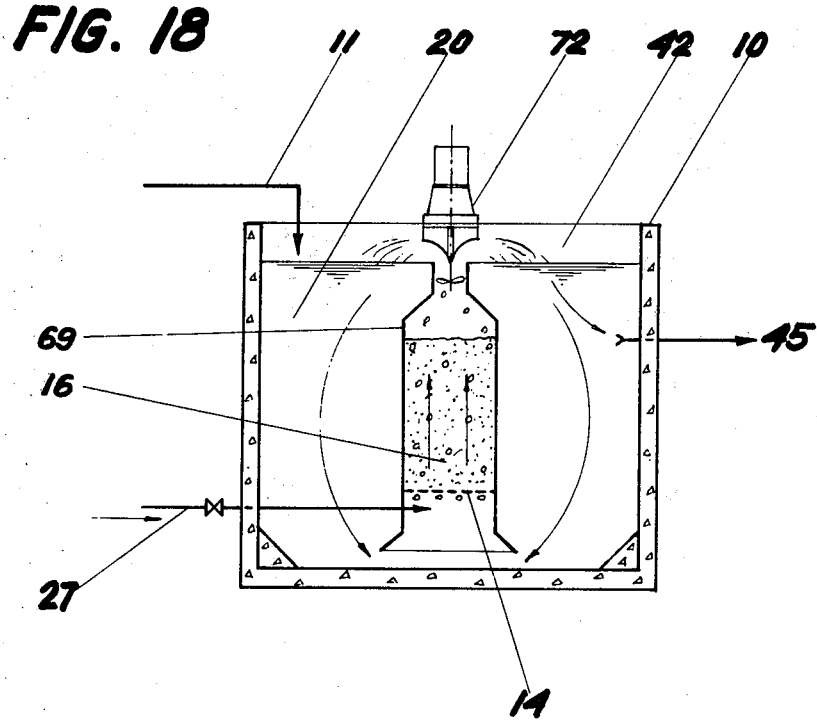

FIG. 18 is similar to FIG. 17 but has a pump type surface aerator 72.

Figure 19:
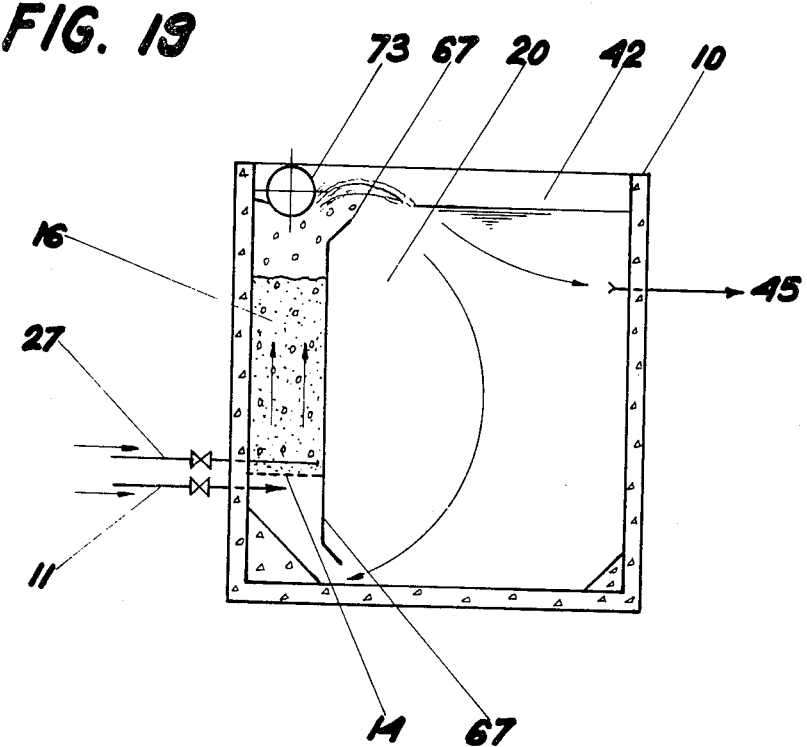

FIG. 19 is similar to FIG. 15 but has a rotating brush 73 on top of the BMFB zone 16. Additional aeration to the BMFB zone 16 is provided through the pipe 27 if required.

Figure 20:
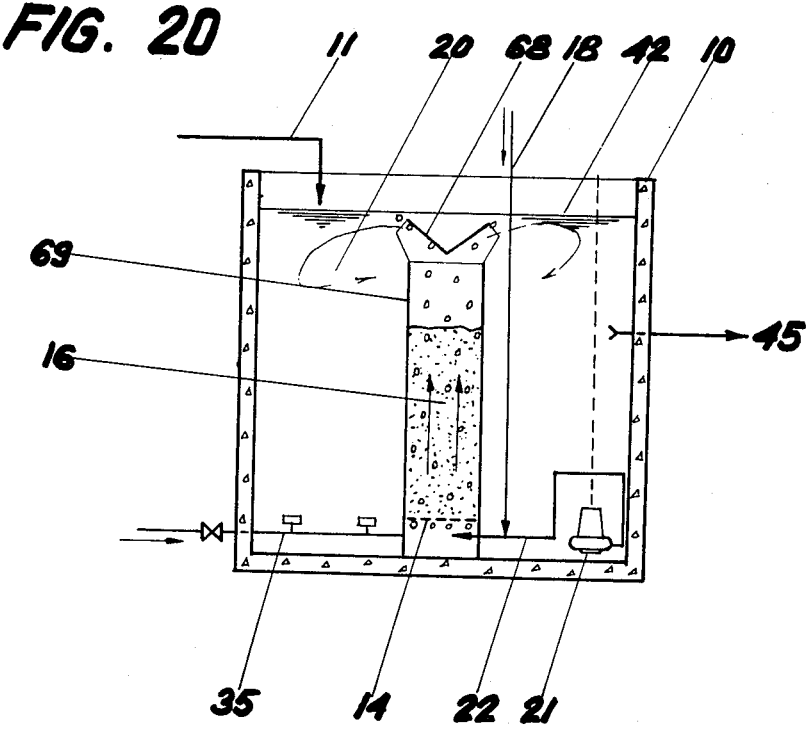

FIG. 20 shows an arrangement similar to FIG. 15 but having recycle pump 21 and air supply through the pipe 18. The AS zone 20 has additional aeration system 35 if required.

Figure 21:
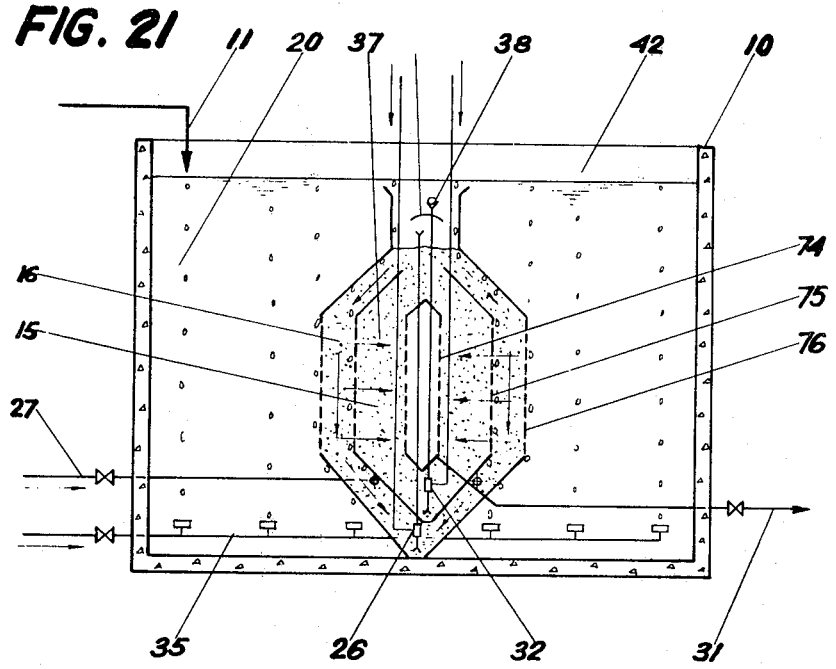

FIG. 21 shows an arrangement similar to FIG. 9, but the BMFB zone 16 and BSFB zone 15 are placed within three centrally located cylinders each cylinder having a conical bottom and cylindrical walls to allow horizontal waste flow from the AS zone 20 to collecting system 74. Between a collecting system cylinder 74 and second cylinder 75 there is the BSFB zone 15 with backwash air-lift 32. Between the second cylinder 75 and third distribution cylinder 76 is the BMFB zone 16 with air-lift 26 for waste and media recycle and aeration. Supplementary air for the BMFB zone is supplied through the pipe 27. The AS zone 20 is equipped with a separate aeration system 35.

Figure 22:
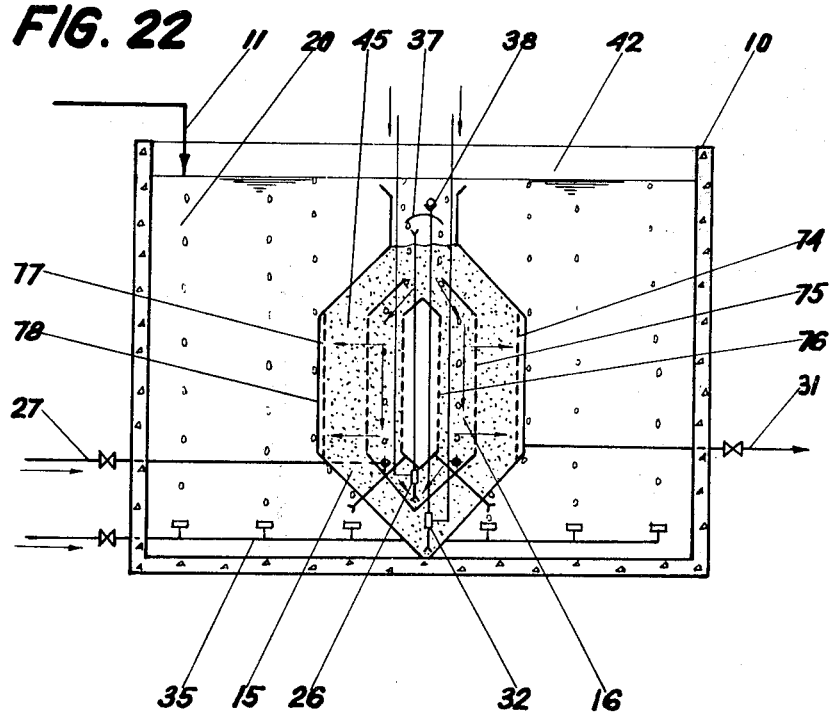

FIG. 22 is similar to FIG. 21 but has horizontal waste flow in the opposite direction i.e. from the central distribution cylinder 76, through the BMFB zone 16 and second cylinder 75 to the BSFB zone 15. Treated effluent passes from BSFB zone 15 to the collecting system 74 and gathered in ring space 77 creased by outer, solid, tank wall 78.

Figure 23:
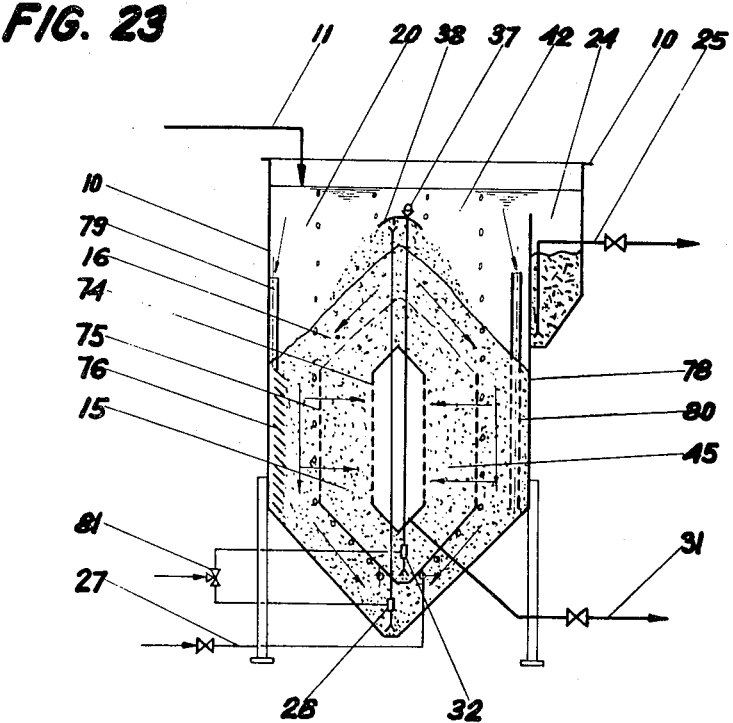

FIG. 23 is similar to FIG. 21 but has only one tank with the AS zone 20 located above the BMFB 16 and BSFB 15 zones. An additional distribution system is located arount the BMFB media and consists of a permeable cylindrical baffle 76 with a pipe connection 79 to the AS zone 20, or with vertical permeable pipes 80 placed around the outer solid tank wall 78. Both airlifts are connected to the same air-supply line and are operated by a three way control valve 81. For sludge removal there is sludge concentrator 24 and pipe 25.

Figure 24:
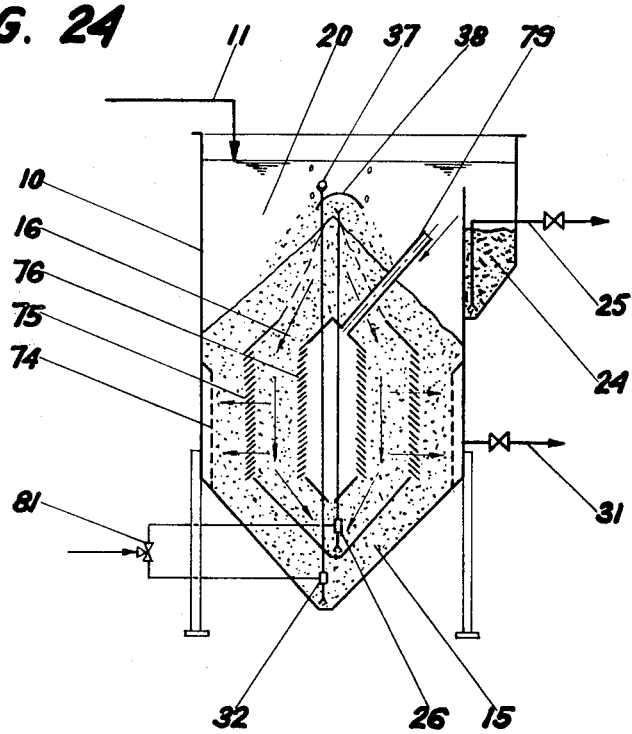

FIG. 24 is similar to FIG. 22 but has only one tank with the AS zone 20 located above the BMFB 16 and BSFB 15 zones, and with sludge concentrator 24 and extraction pipe 25.

What I claim as my invention is:

1. A process for the treatment of wastes such as sewage and waste liquid, said process comprising: maintaining a submerged aerated biological filter bed zone containing finely divided particulate filtering media which is circulated in said zone; maintaining an aerated activated sludge zone in upstream fluid zone, feeding waste to be treated to said activated sludge zone; recycling said waste from said activated sludge zone through said biological filter bed back to said activated sludge zone; maintaining a biological stable filter bed zone in downstream fluid flow relationship to said aerated biological filter bed zone and said activated sludge zone so that the waste passes thereto; draining treated waste from said biological stable filter bed zone; and backwashing said biological stable filter bed zone as often as required to maintain the operating effectiveness of said biological stable filter bed zone and an acceptable headloss at the point of withdrawal of the treated effluent.

2. The process according to claim 1 wherein the waste is fed to the aerated biological filter bed zone.

3. The process according to claim 1, wherein sludge in excess of that required in the process is collected in a sludge concentrator zone adjacent to and in communication with the activated sludge zone.

4. A process as claimed in claim 1 in which the biological stable filter bed is made of a plurality of layers, the particles in each layer being different in size from the particles in a neighbouring layer.

5. A process as claimed in claim 1 in which there are a plurality of aerated biological filter bed and biological stable filter bed zones, each zone being spaced from its neighbouring zone.

6. A process as claimed in claim 1 in which the waste is fed through said process under pressure.

7. A process as claimed in claim 1 in which the waste is drawn through said process under vacuum.

8. A process as claimed in claim 1 in which aeration of said aerated biological filter bed zone is carried out by feeding air into the bottom part of said aerated biological filter bed zone.

9. A process as claimed in claim 1 in which aeration of said biological filter bed zone is carried out by air-lifts placed in said aerated biological filter bed zone.

10. A process as claimed in claim 1 in which aeration of said activated sludge zone is carried out by submerged aerators placed in the activated sludge zone.

11. A method as claimed in claim 1 in which said backwashing is carried out by first draining the liquid from the activated sludge zone and then backwashing the filter media with air and sufficient water to refill the activated sludge zone.

12. A process as claimed in claim 1 in which aeration is carried out with a compressed gas utilizing oxygen.

13. A process as claimed in claim 1 in which aeration of said aerated biological filter bed zone in carried out intermittently.

14. A process as claimed in claim 1 in which the biological stable filter bed zone is replaced by a settling zone.

15. The process claimed in claim 1 wherein aeration of said activated sludge zone and said aerated biological filter bed zone is carried out with a compressed gas utilizing oxygen-enriched air.

16. An apparatus for the treatment of wastes such as sewage and waste liquid, said apparatus comprising: a submerged aerated biological filter bed zone containing finely divided particulate filtering media; means for continuously circulating the particulate filtering media in said aerated biological filter bed zone; an aerated activated sludge zone located in upstream fluid flow relationship to said aerated filter bed zone; means for supplying waste to be treated to said activated sludge zone; means for recycling waste from activated sludge zone through said aerated filter bed back to activated sludge zone; a biological stable filter bed zone located in downstream fluid flow relationship to said aerated biological filter bed zone and said activated sludge zone; means for removing treated effluent from said biological stable filter bed zone; means for backwashing said biological filter bed zone as often as required and means for removing backwashings.

17. An apparatus as claimed in claim 15 that includes an excess sludge concentrator operatively associated with said activated sludge zone.

18. An apparatus as claimed in claim 17 in which the sludge concentrator is open at the bottom to allow recirculation of the sludge.

19. An apparatus as claimed in claim 15 in which the media within said aerated filter bed zone is circulated by upwards flow of sewage or the like.

20. An apparatus as claimed in claim 15 in which the media within said aerated filter bed zone is circulated by air-lifts.

21. An apparatus as claimed in claim 20 in which the upper part of each air-lift is rotated by the force of emission of the air.

22. An apparatus as claimed in claim 20 in which a separate waste water supply is connected to the bottom of each air-lift.

23. An apparatus as claimed in claim 20 in which each air-lift has a conic baffle positioned below its outlet to direct filtering media.

24. An apparatus as claimed in claim 20 in which there is a defelector plate over the top of each air-lift.

25. An apparatus as claimed in claim 15 in which said means for backwashing is a set of air-lifts placed in bottom of said biological stable filter bed zone.

26. An apparatus as claimed in claim 16 in which the means for supplying waste is positioned to feed waste to the aerated filter bed zone.

27. An apparatus as claimed in claim 15 that includes means to reduce the amount of foam in said activated sludge zone.

28. An apparatus as claimed in claim 16 which said circulating means comprises means for introducing compressed air into the bottom of said aerated filter bed zone.

29. An apparatus as claimed in claim 15 in which said circulating means comprises an air-lift.

30. An apparatus as claimed in claim 15, in which said means to circulate said sewage and the like is a pump.

31. An apparatus as claimed in claim 15 in which said circulating means comprises an aerator.

32. An apparatus as claimed in claim 15 in which the aerated filter bed zone is divided into separate compartments by a permeable wall.

33. An apparatus as claimed in claim 16 in which the aerated filter bed zone is separated from the biological stable filter bed zone by a waste-permeable wall.

34. An apparatus as claimed in claim 16 in which said means for removing treated effluent comprises inverted "V"-shaped baffles placed within the biological stable filter bed media.

* * * * *

UNITED STATES PATENT OFFICE
CERTIFICATE OF CORRECTION

Patent No. 3,968,034            Dated July 6, 1976

Inventor(s) Jerzy Tymoszczuk            Page 1 of 2

It is certified that error appears in the above-identified patent and that said Letters Patent are hereby corrected as shown below:

Column 1, line 38, change "systems'" to --systems--.
Column 2, line 23, change "adequate amounts" to --an adequate amount--.
Column 5, line 61, change "shape," to --shaped--.
Column 6, line 20, change "BFMB" to --BMFB--.
Column 7, line 65, change "at" to --through--.
Column 8, line 12, insert after "16" --by--.
Column 8, line 18, change "18" to --27--.
Column 9, line 35, change "locate" to --provide--; and change "of" to --for--.
Column 9, line 39, change "as an" to --and--.
Column 10, line 7, insert after "allow" --waste--; change "of" to --between--; line 12, change "18" to --27--.
Column 10, line 27, insert after "cylindrical" --perforated--.
Column 10, line 42, change "creased" to --created--.
Claim 1, line 6, insert after "fluid" --flow relationship to said aerated biological filter bed--.
Claim 1, line 13, change "draining" to --withdrawing--.
Claims 17,19,20,25,27,29,30,31, and 32, change the dependency to Claim 16.
Fig. 5, change "14" to --41--.
Fig. 6, change "33" to --32--.
Fig. 8, add numeral 42 and a lead line drawn to the element corresponding to element 42 in Fig. 7.
Fig. 13, change "37" to --38-- and "38" to --37--.
Fig. 16, add numeral 20 and a lead line drawn to the element corresponding to element 20 in Fig. 15.

UNITED STATES PATENT OFFICE
CERTIFICATE OF CORRECTION

Patent No. 3,968,034　　　　　　　　　Dated July 6, 1976

Inventor(s) Jerzy Tymoszczuk　　　　　　Page 2 of 2

It is certified that error appears in the above-identified patent and that said Letters Patent are hereby corrected as shown below:
(Continued from page 1)

Fig. 21, change "37" to --15--; change "38" to --37--; add numeral --38-- to lead line at top of figure that is missing an identifying numeral.

Fig. 22, change "37" to --38--; change "38" to --37--.

Signed and Sealed this

Eleventh Day of January 1977

[SEAL]

Attest:

RUTH C. MASON
*Attesting Officer*

C. MARSHALL DANN
*Commissioner of Patents and Trademarks*